(12) United States Patent
Boyak et al.

(10) Patent No.: US 9,199,213 B2
(45) Date of Patent: Dec. 1, 2015

(54) FIXED-BED CATALYST SUPPORT FOR A HYDROPROCESSING REACTOR

(71) Applicants: Craig Boyak, El Cerrito, CA (US); Ralph Evans Killen, San Francisco, CA (US)

(72) Inventors: Craig Boyak, El Cerrito, CA (US); Ralph Evans Killen, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 431 days.

(21) Appl. No.: 13/663,562

(22) Filed: Oct. 30, 2012

(65) Prior Publication Data

US 2013/0064731 A1    Mar. 14, 2013

(51) Int. Cl.
*B01J 8/02* (2006.01)
*C10G 49/00* (2006.01)
*B01J 8/04* (2006.01)

(52) U.S. Cl.
CPC ............... *B01J 8/025* (2013.01); *B01J 8/0453* (2013.01); *B01J 8/0492* (2013.01); *C10G 49/002* (2013.01); *B01J 2208/00884* (2013.01)

(58) Field of Classification Search
CPC .................. B01J 2208/00884; C10G 49/002
See application file for complete search history.

(56) References Cited

U.S. PATENT DOCUMENTS

| | | | | |
|---|---|---|---|---|
| 3,235,344 A | * | 2/1966 | Dreyer et al. ................. | 422/638 |
| 3,353,925 A | * | 11/1967 | Baumann et al. ............. | 422/214 |
| 3,653,845 A | * | 4/1972 | Moravec ....................... | 422/311 |
| 3,695,851 A | * | 10/1972 | Perga ............................ | 422/179 |
| 5,779,773 A | * | 7/1998 | Cam et al. ..................... | 96/152 |

\* cited by examiner

*Primary Examiner* — Jennifer A Leung
(74) *Attorney, Agent, or Firm* — Michael D. Ross (57) ABSTRACT

The present invention is directed to an upwardly convex fixed-bed catalyst support for a hydroprocessing reactor. The catalyst bed support includes an upwardly convex annular-shaped plate having an outer end in communication with the reactor inner surface, and an inner end in communication with a horizontal hub assembly.

10 Claims, 8 Drawing Sheets

FIXED-BED CATALYST SUPPORT FOR A HYDROPROCESSING REACTOR

FIELD OF THE INVENTION

This invention is directed to a fixed-bed catalyst support for a hydroprocessing reactor. Such hydroprocessing reactors are used in the petroleum and chemical processing industries for carrying out catalytic reactions of hydrocarbonaceous feedstocks in the presence of hydrogen, at elevated temperatures and pressures. Exemplary reactions including hydrotreating, hydrofinishing, hydrocracking and hydrodewaxing.

BACKGROUND OF THE INVENTION

In fixed-bed hydroprocessing reactors, gas and liquid reactants (e.g. hydrogen and a hydrocarbonaceous feedstock) flow downward through one or more beds of solid catalyst extrudates. As the reactants flow downward through the catalyst beds, the reactants react to produce the desired products. Gas phase reactants such as hydrogen are consumed, and heat is generated by the catalytic reactions.

Figure 1:
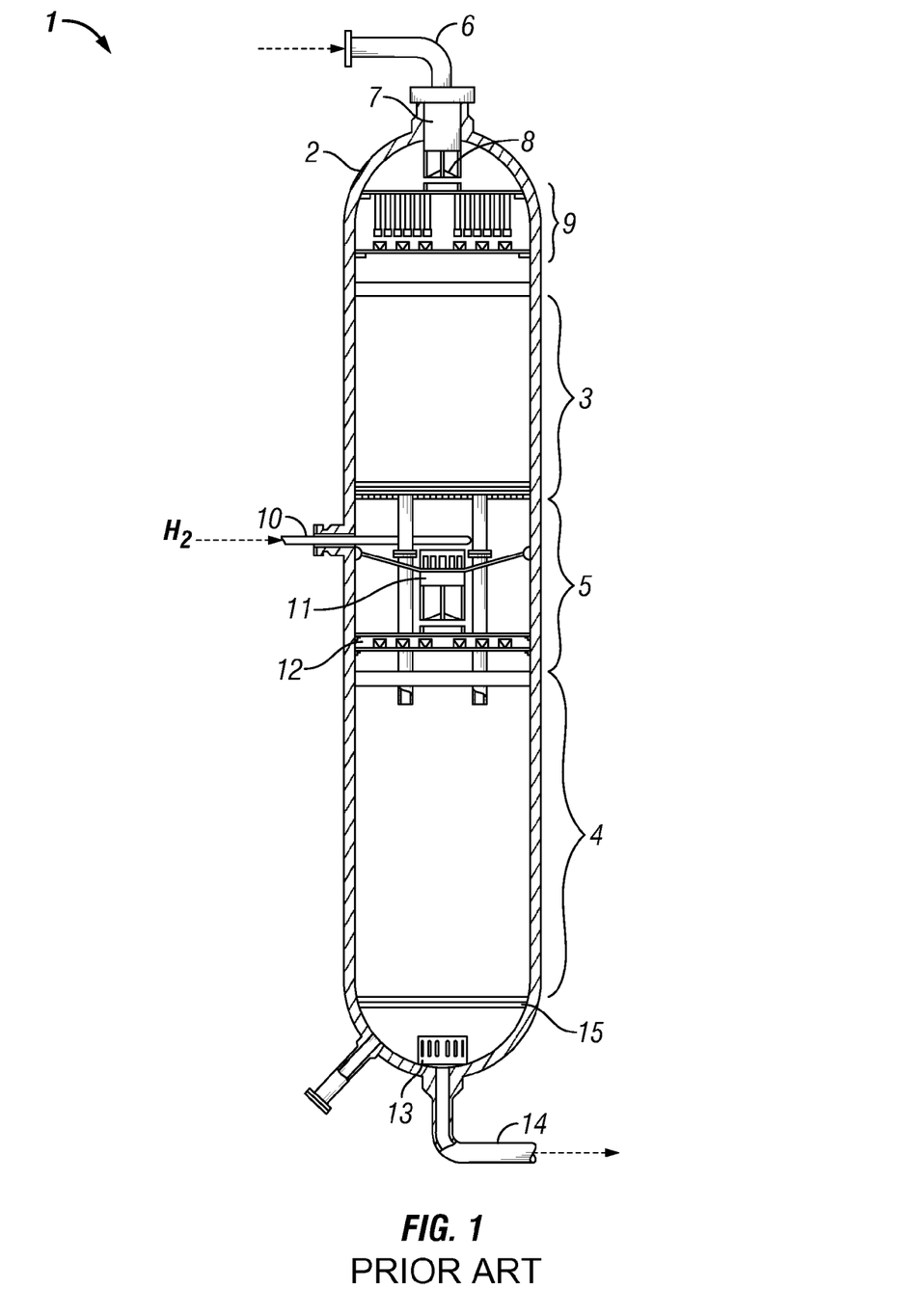
FIG. 1 is a cross-sectional diagram of a conventional hydroprocessing reactor.

FIG. 1 is a cross-sectional schematic diagram of a conventional vertical, down-flow reactor such as the one disclosed in U.S. Pat. No. 3,824,080 to Smith et al., issued Jul. 16, 1974. The reactor 1 includes a reactor vessel 2 having upper and lower catalyst zones 3 and 4, respectively, and a quench zone 5 there between.

A liquid hydrocarbonaceous feedstock is introduced into the vessel 2 via line 6 through inlet nozzle 7. The feedstock strikes a splash plate 8 distributing the feedstock across a nozzle distribution assembly 9 adapted to uniformly spray the feedstock across the top of the upper catalyst zone 3.

The effluent from the upper catalyst zone 3 passes to the quench zone 5. As feedstock flows downward through the catalyst zones 3, 4, the feedstock contacts catalyst extrudates and reacts to produce the desired products. Gas phase reactants such as hydrogen are consumed, and heat is generated by the catalytic reactions.

Controlling the temperature of the feedstock as it travels downward through the vessel 2 is important to ensure the quality and quantity of product yield is maximized toward the target product(s). These features are accomplished in the quench zone 5 wherein: (1) hydrogen quench gas is injected into the vessel 2 via line 10, (2) quench hydrogen gas is mixed with the liquid effluent flowing down from the upper catalyst zone 3 using a mixing device 11, and (3) a quench zone nozzle distribution assembly 12 uniformly sprays the quenched feedstock across the top of the lower catalyst zone 4.

The quenched feedstock flows downward through second catalyst zone 4 wherein reactants undergo additional catalytic reactions. Effluent from the second reaction zone 4 enters a conventional outlet cap 13, and the reaction effluent exits the reactor vessel 2 via line 14.

In a conventional reactor, such as the reactor illustrated in FIG. 1, the lowermost or bottom catalyst bed can be supported above the outlet using a horizontal catalyst tray (illustrated as element 15 in FIG. 1). However, such designs produce empty or dead spaces at the bottom of the reactor. In addition, the amount of active catalyst that can be loaded into the lower catalyst bed is limited by the static load limits of the horizontal tray. This limitation is significant because available feedstocks are become increasingly disadvantaged, requiring more hydroprocessing which, in turn, necessitates loading more catalyst material into existing reactors.

Other conventional reactors substitute a bed of inert material, such as inert ceramic spheres, for the lower bed horizontal catalyst tray. (See, drawing element 13 of FIG. 1, US 2006/0163758 to Muller, published Jul. 27, 2006). While use of inert materials as the lower catalyst bed support allows for the loading of more active catalyst into the lower bed as compared to a conventional horizontal tray, such inert bed supports add substantial additional costs. In addition, over time the inert materials breakdown, producing fines that must be collected and removed downstream from the reactor, and requires periodic replacement of the inert material.

Accordingly, there is a continued need for lower catalyst bed support systems that reduce or eliminate empty or dead spaces at the bottom of conventional hydroprocessing reactors. In addition, there continues to be a need for catalyst bed support systems that allow refiners to load increasing amounts of catalyst materials into a reactor, without resorting to use of inert catalyst support particle beds, which degrade over time and add significant operating costs to the refinery.

SUMMARY OF THE INVENTION

The present invention is directed to an upwardly convex fixed-bed catalyst support for a hydroprocessing reactor. The catalyst bed support includes an upwardly convex annular-shaped plate having an outer end in communication with the reactor inner surface, and an inner end in communication with a removable manway cover assembly.

The manway cover assembly is removably affixed to a manway cover support band which, in turn, is rigidly affixed to the plate inner edge. During turnaround operations, removal of the manway cover assembly allows workers access through the catalyst bed support to the reactor area below the catalyst bed support.

DETAILED DESCRIPTION

It has been found the upwardly convex porous fixed-bed catalyst support of the present invention affords benefits over catalyst bed support systems known in the art. Such benefits include, without limitation, reduction or elimination of empty or dead spaces at the bottom of conventional hydroprocessing reactors, increased catalyst loading capacity, and reduced cost. Specific embodiments and benefits are apparent from the detailed description provided herein. It should be understood, however, that the detailed description and specific examples, while indicating embodiments among those preferred, are intended for purposes of illustration only and are not intended to limit the scope of the invention.

Figure 2:
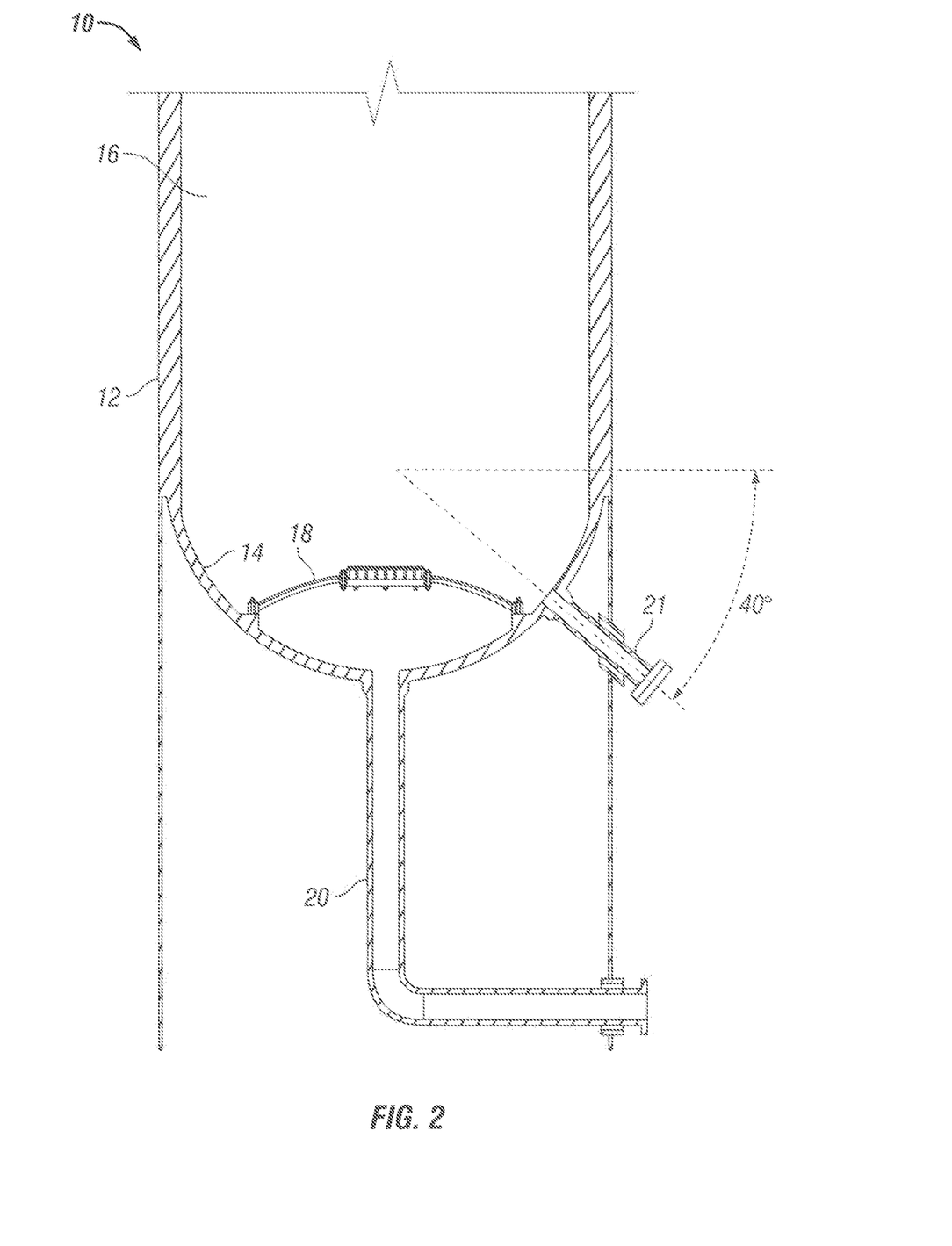
FIG. 2 is a cross-sectional diagram of a catalyst bed support of the present invention as installed in a reactor.

The present invention is directed to an upwardly convex porous fixed-bed catalyst support for a hydroprocessing reactor. Referring to FIG. 2, a cross-sectional diagram of a lower portion of a fixed-bed down-flow reactor 10 is illustrated.

The reactor 10 includes a vessel shell 12 having an inner wall 14, a catalyst bed 16 containing packed catalytic extrudates supported on an upwardly convex catalyst bed support 18 of the present invention. The convex catalyst bed support 18 is affixed to the vessel shell inner wall 14. The reactor 10 further includes an outlet 20 for discharging product effluent from the reactor 10 during commercial service, and a catalyst drain tube 21 for removing spent catalyst extrudates during turnaround operations. As illustrated in FIG. 2, the catalyst drain tube 21 extends downwardly from the bottom of the reactor 10 at an approximately 40° angle and at a location above the catalyst bed support 18. In other embodiments no illustrated in FIG. 2, the drain tube 21 extends downwardly from the bottom of the reactor 10 at an angle of between 30 and 90 degrees (at 90°, the drain tube extends vertically downward from the bottom of the reactor 10).

As illustrated in FIG. 2, the catalyst bed support 18 vertically supports the lowermost catalyst bed 16 in the reactor 10, proximal to the reactor outlet 20.

Figure 3:
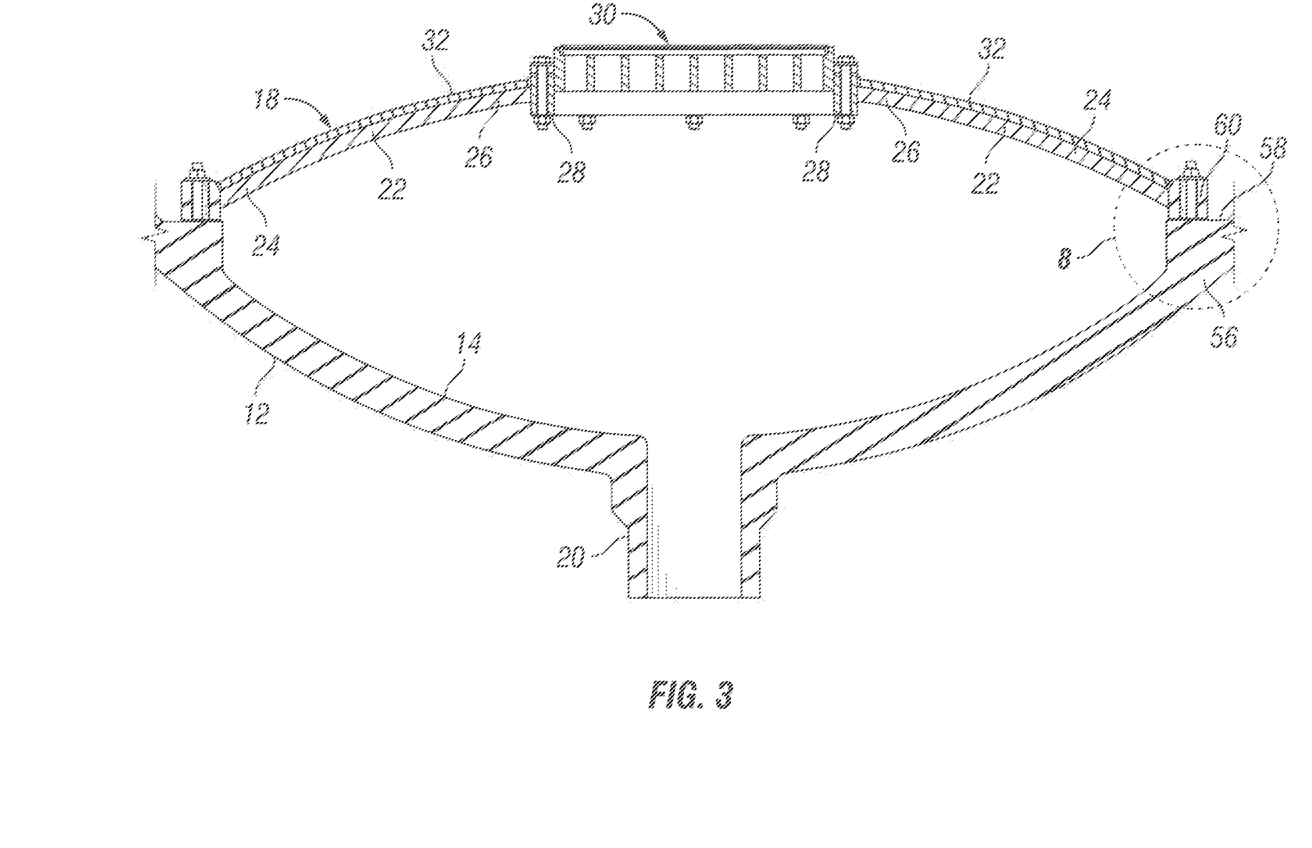
FIG. 3 is another cross-sectional diagram of a catalyst bed support of the present invention as installed in a reactor.

Referring to FIG. 3, a cross-sectional diagram of the upwardly convex catalyst bed support 18 in communication with the vessel shell inner wall 14 is illustrated. The catalyst bed support 18 includes an upwardly convex annular-shaped perforated plate 22 having an outer end 24 in communication with the reactor inner surface, and an inner end 26 affixed to a manway cover support band 28 to which a manway cover assembly 30 is removably affixed. Preferably, the annular-shaped perforated plate 22 is constructed as a unitary member.

Figure 4A:
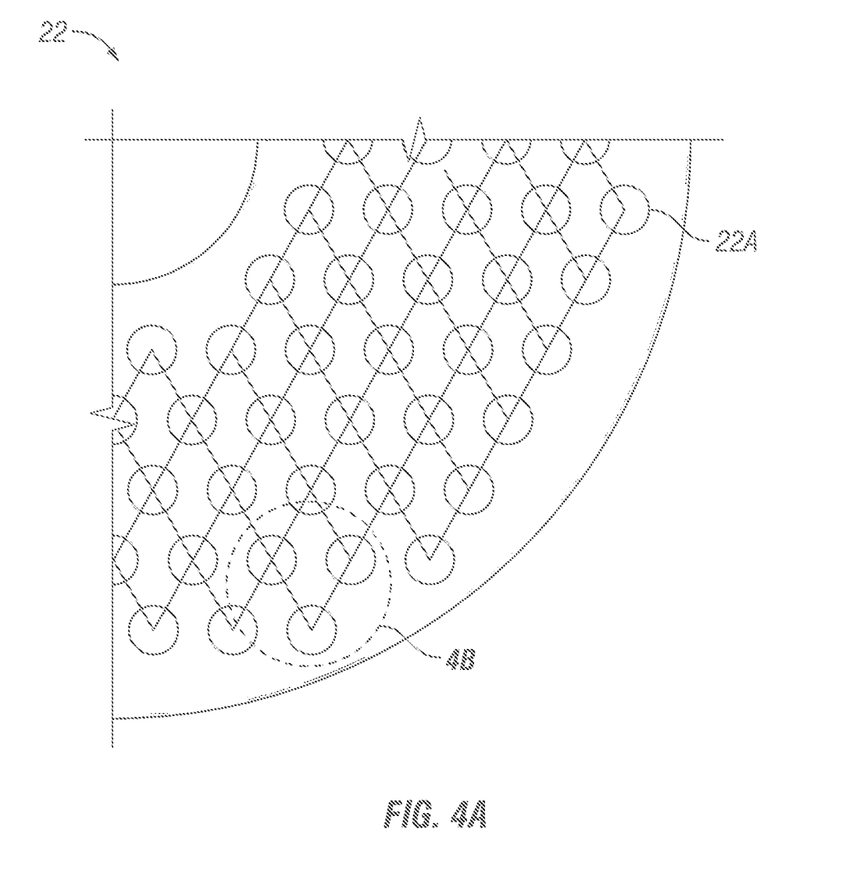
FIG. 4A is a top developed-view of a section of an annular-shaped perforated plate forming a part of the catalyst bed support.
Figure 4B:
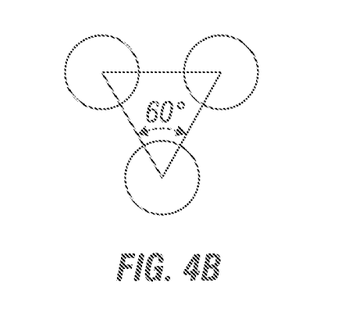
FIG. 4B is an illustration of the pitch pattern of the openings of the annular-shaped perforated plate.

As shown in FIG. 4A, the annular-shaped perforated plate 22 has a plurality of openings defined by edges 22a which impart porosity to the support 18 allowing liquid and gaseous reactants to pass through the support while substantially retaining the catalyst extrudates in place within the reactor 10 above the support 18. The openings are arranged in a pitch pattern which, collectively, defines a plate open area of between 25 and 40 percent, typically between 30 and 35 percent. In one embodiment as illustrated in FIG. 4B, the pitch pattern is a 60° pitch pattern, wherein inside angle between ligament sections (a ligament section being an imaginary line a extending between the centers of neighboring plate openings) is a 60° angle.

Figure 5:
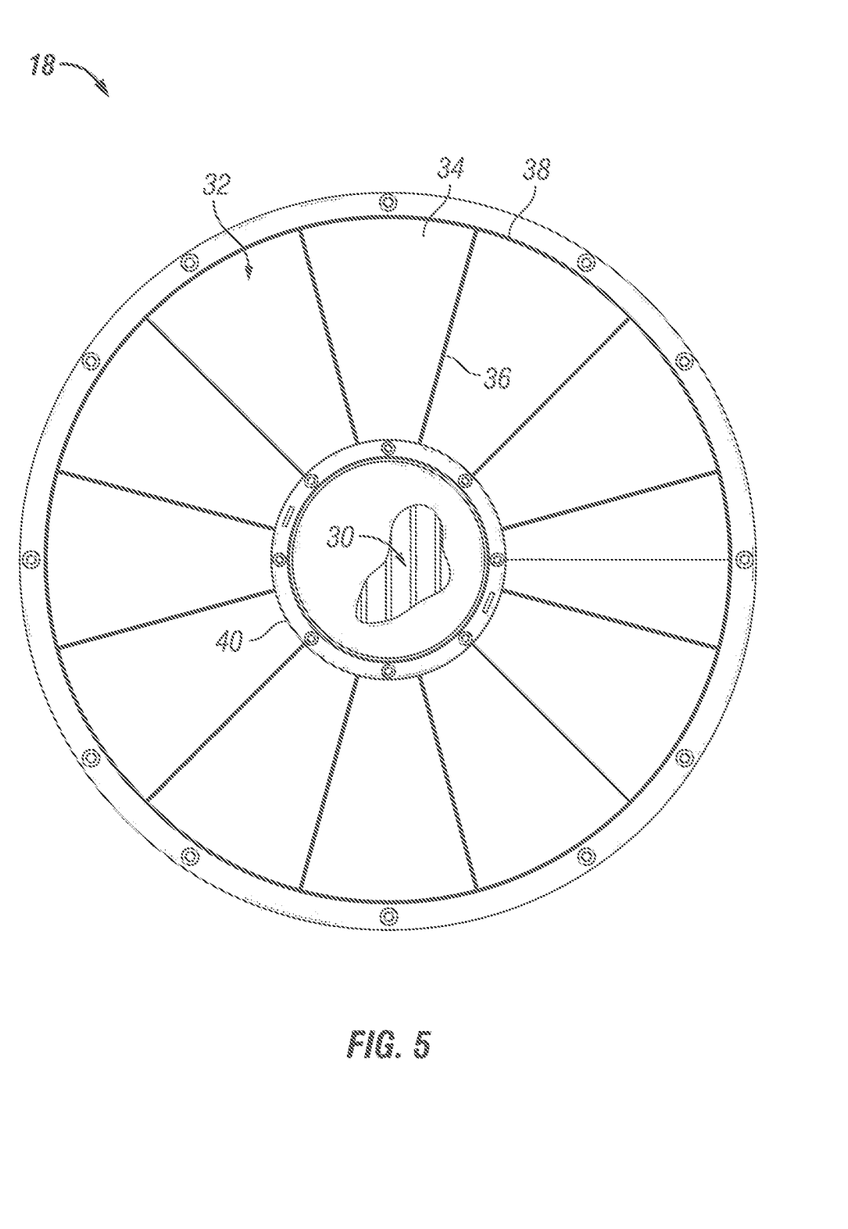
FIG. 5 is a top plan-view of the annular-shaped perforated plate and manway cover assembly.

Referring again to FIG. 3, a catalyst support screen 32 is positioned on top of and extends over the entire upper surface of the plate 22. In one embodiment illustrated in FIG. 5, the screen 32 is constructed from a plurality of radially extending screen sections 34, each having radially extending long edges 36, an outer circumferential edge 38 proximal to the reactor internal surface 14, and an inner circumferential edge 40 proximal to the manway cover assembly 30. Each screen section 34 abuts its neighboring screen section along their respective long edges 36.

Figure 6:
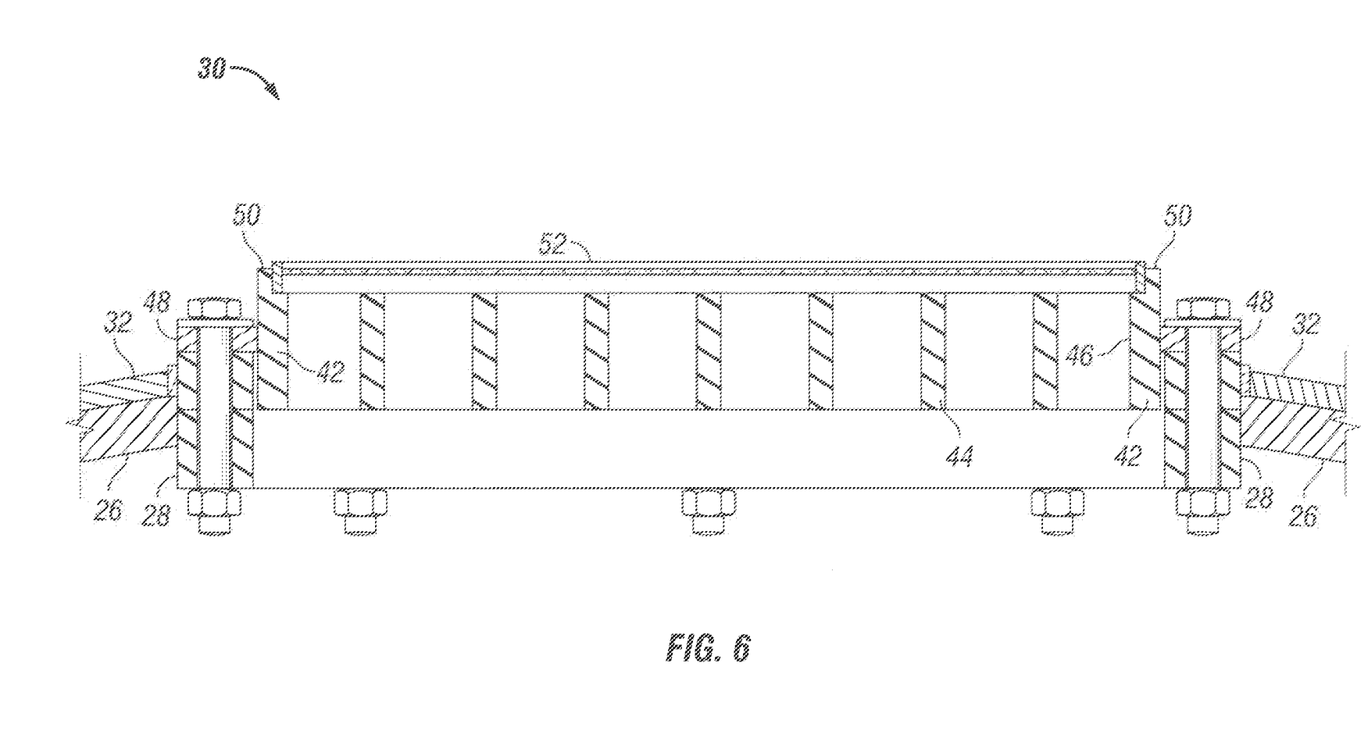
FIG. 6 is a cross-sectional diagram of the annular-shaped perforated plate and manway cover assembly.

Referring to FIG. 6, a cross-sectional diagram of the manway cover assembly 30 is illustrated. The manway cover assembly 30 is removably affixed to the manway cover support band 28 which, in turn, is rigidly affixed to the plate inner end 26. During turnaround operations involving reactor maintenance, catalyst removal and replacement and the like, removal of the manway cover assembly 30 allows workers access through the catalyst bed support 18 to the reactor area below the support 18.

Figure 7:
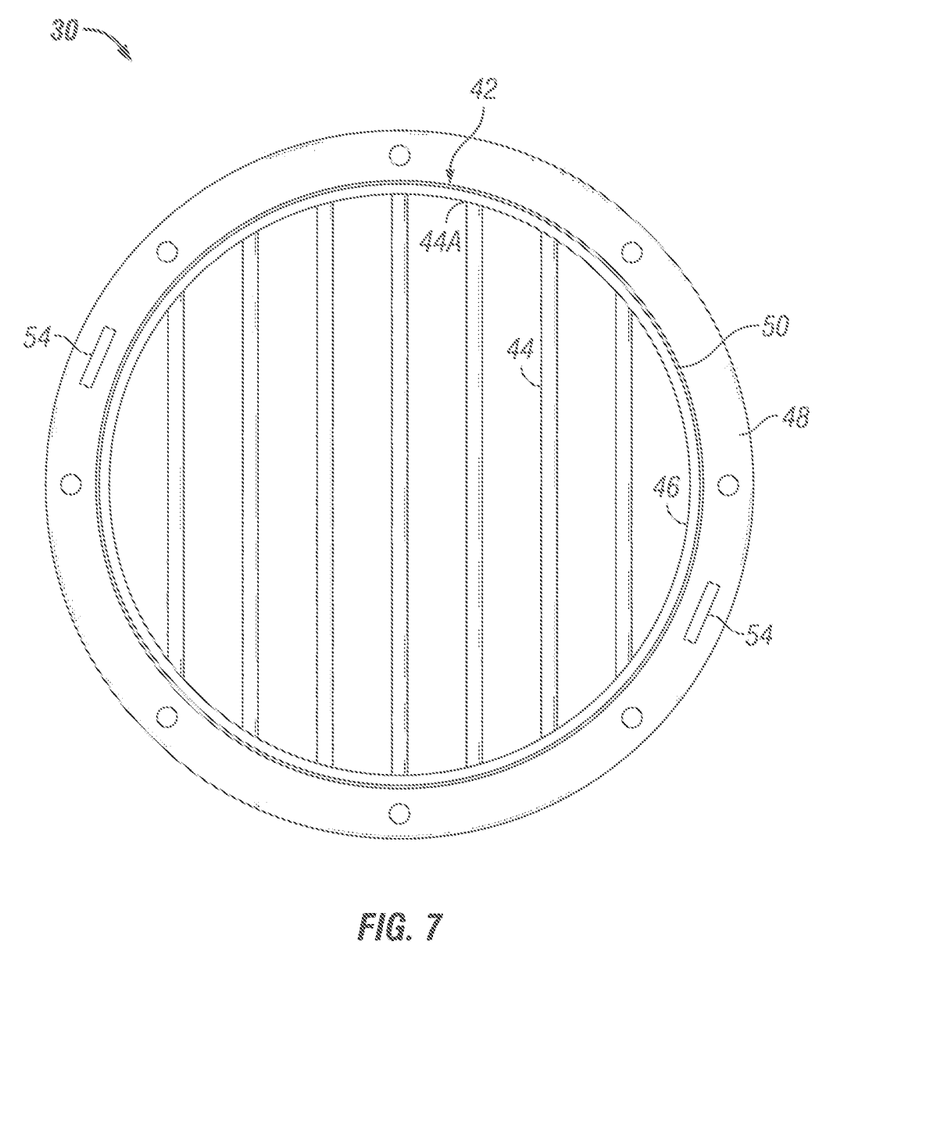
FIG. 7 is a top plan-view of the manway cover assembly.

As shown in FIGS. 6 and 7, the manway cover assembly 30 includes a grid bar support band 42 for rigidly supporting a plurality of horizontally positioned grid bars 44 having short ends 44a securely affixed to the inner edge 46 of the support band 42. The grid bar support band 42 is provided with a horizontal support band flange 48 for supporting the manway cover assembly 30 on the top edge of the manway cover support band 28.

A screen retention lip 50 extending upwardly from top edge of the grid bar support band 42 is provided for restricting horizontal movement of a horizontal catalyst support screen 52 supported on top of the manway cover assembly 30 by the grid bars 44 and support band 42.

One or more lifting lugs 54 extending upwardly from, and rigidly associated with, the support band flange 48 are provided for simplifying the installation and removal of the manway cover assembly 30. When the reactor 10 is not in operation, the manway cover assembly 30 is removable and serves as a manway cover allowing workers access through the catalyst support 18 to the area below the support 18.

Figure 8:
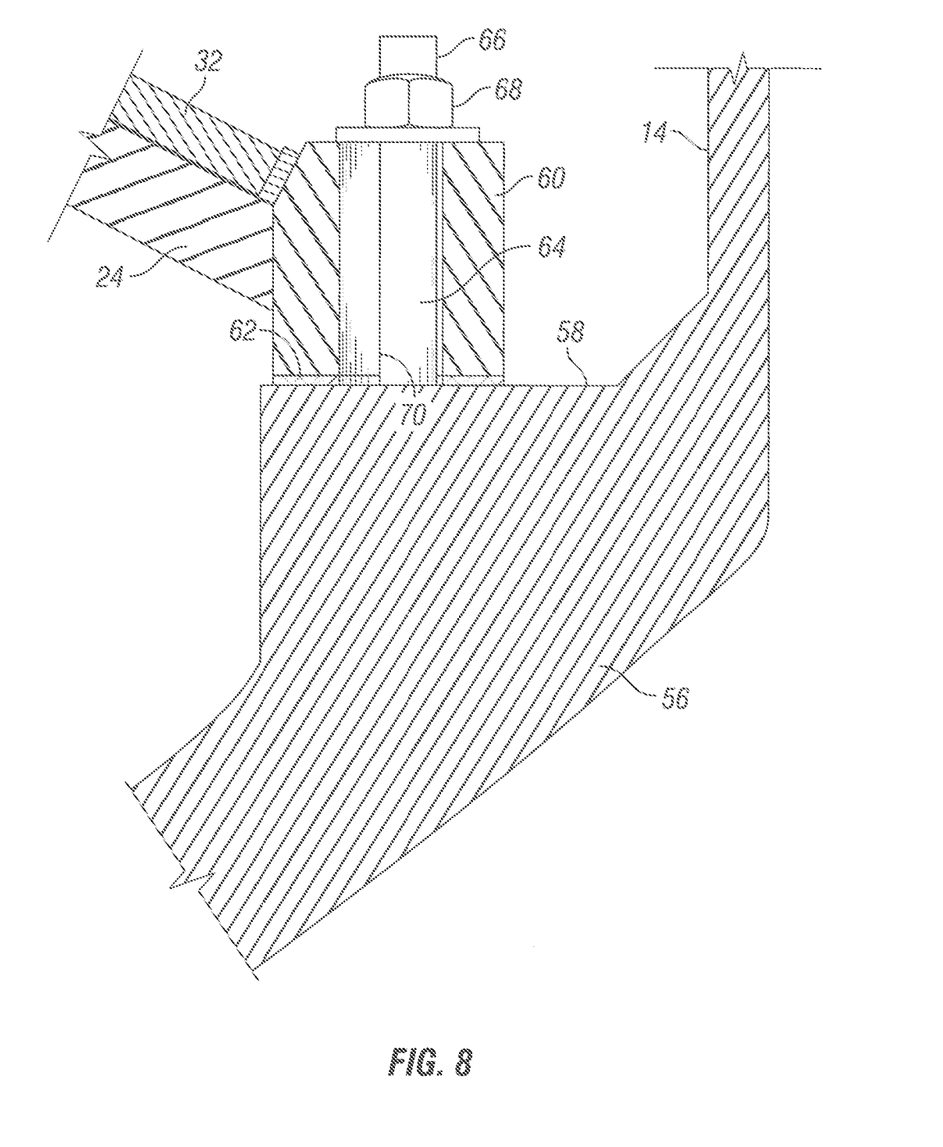
FIG. 8 is another cross-sectional diagram of a catalyst bed support of the present invention as installed in a reactor.

Referring to FIG. 8, a cross sectional diagram of the annular-shaped plate outer end 24 in communication with the reactor inner wall 14 is illustrated. A support ridge 56 protrudes from the reactor vessel inner wall 14 and has a horizontal support surface 58 (see also FIG. 3). The support ridge 56 is formed on the reactor vessel inner wall 14 using conventional weld build-up techniques.

A catalyst bed support band 60 is rigidly affixed to the annular-shaped plate outer end 24 and has a bottom surface 62 vertically supported by the support ridge horizontal support surface 58. The catalyst bed support band 60 is preferably affixed to the reactor catalyst support ridge 56.

In one embodiment, a plurality of support ridge mounting posts 64 fixedly extend upwardly from the horizontal support surface 58 and are provided with threaded top ends 66 adapted to receive a female threaded member such as a nut 68. When the support system 18 is mounted in the reactor, the mounting posts 64 extend through correspondingly located support band bores defined by edge 70, affixing the catalyst support 18 to the reactor catalyst support ridge 56. The support band bores 70 are slotted or oversized to allow the catalyst bed support band 60 move out radially relative to the reactor catalyst support ridge 56, which will typically have a slower rate of thermal expansion relative to the catalyst bed support band 60.

The previous description of a preferred embodiment of the present invention is primarily for illustrative purposes, it being recognized that a number of variations might be used which would still incorporate the essence of the invention. Accordingly, reference should be made to the following claims in determining the scope of the invention.

What is claimed is:
1. A reactor, comprising:
 a reactor vessel having an internal surface; and
 an upwardly convex porous catalyst support in communication with the internal surface;
 wherein the catalyst support comprises an upwardly convex annular-shaped plate having an outer edge in communication with the internal surface, and an inner edge in communication with a manway cover assembly; and
 wherein the manway cover assembly comprises:
  a grid bar support band in communication with the annular-shaped plate inner edge,
  a plurality of horizontally positioned grid bars, each grid bar having a short end securely affixed to the grid bar support band, and a horizontal catalyst support screen supported on top of the manway cover assembly by the grid bars and grid bar support band.

2. The reactor of claim 1, wherein the catalyst support is a fixed-bed catalyst support.

3. The reactor of claim 1, wherein the annular-shaped plate comprises a plurality of openings which, collectively, defines a plate open area of between 25 and 40 percent.

4. The reactor of claim 1, wherein the grid bar support band further comprises a screen retention lip extending upwardly from top edge of the grid bar support band for restricting horizontal movement of the horizontal catalyst support screen.

5. The reactor of claim 1, further comprising a support ridge protruding from the internal surface, the support ridge having a horizontal support surface;
the catalyst support further comprising a catalyst support band rigidly affixed to the annular-shaped plate outer edge, the catalyst support band having a bottom surface vertically supported by the support ridge horizontal support surface.

6. A reactor, comprising:
a reactor vessel having an internal surface; and
an upwardly convex porous catalyst support in communication with the internal surface;
wherein the catalyst support comprises:
an upwardly convex annular-shaped plate having an outer edge in communication with the internal surface, and an inner edge affixed to a manway cover support band, and
a manway cover assembly in removable communication with the manway cover support band; and
wherein the manway cover assembly comprises:
a grid bar support band removably affixed to the manway cover support band,
a plurality of horizontally positioned grid bars, each grid bar having a short end securely affixed to the grid bar support band, and
a horizontal catalyst support screen supported on top of the manway cover assembly by the grid bars and grid bar support band.

7. The reactor of claim 6, wherein the catalyst support is a fixed-bed catalyst support.

8. The reactor of claim 6, wherein the annular-shaped plate comprises a plurality of openings which, collectively, defines a plate open area of between 25 and 40 percent.

9. The reactor of claim 6, wherein the grid bar support band further comprises a screen retention lip extending upwardly from top edge of the grid bar support band for restricting horizontal movement of the horizontal catalyst support screen.

10. The reactor of claim 6, further comprising a support ridge protruding from the internal surface, the support ridge having a horizontal support surface;
the catalyst support further comprising a catalyst support band rigidly affixed to the annular-shaped plate outer edge, the catalyst support band having a bottom surface vertically supported by the support ridge horizontal support surface.

* * * * *